April 7, 1925.

1,532,813

F. F. GUERRA

GREASE STRAINER FOR JOURNAL BOXES

Filed Nov. 12, 1924

Inventor
Francisco Flores Guerra

By

Attorney

Patented Apr. 7, 1925.

1,532,813

UNITED STATES PATENT OFFICE.

FRANCISCO FLORES GUERRA, OF MEXICO CITY, MEXICO.

GREASE STRAINER FOR JOURNAL BOXES.

Application filed November 12, 1924. Serial No. 749,523.

*To all whom it may concern:*

Be it known that I, FRANCISCO FLORES GUERRA, a citizen of the United Mexican States, residing at Mexico City, Federal District, Mexico, have invented certain new and useful Improvements in Grease Strainers for Journal Boxes, of which the following is a specification.

This invention relates to a grease strainer for the journal box of locomotive driving wheels. The object of this invention is to construct a grease strainer which shall avoid the damage commonly done to the journals when particles and chips are torn from the strainer and scratch the journal.

Generally such greases strainers are made from rather hard sheet metal which when worn thin are first cracked, and later on chips are broken off and carried together with the grease between the journal and the axle brass whence they form a serious obstruction giving rise to the warming and wearing of the journals, so that the locomotive must be stopped until the journals are cooled off.

So far grease strainers have been manufactured from rather thin sheet metal and of a hard consistence. My grease strainer is made of a metal alloy 90% lead, 9% antimony and 1% tin, though pure aluminium may be used, and the perforations are oval and conical so as to offer less probability of destruction and resulting breaking off of chips.

Figure 2:
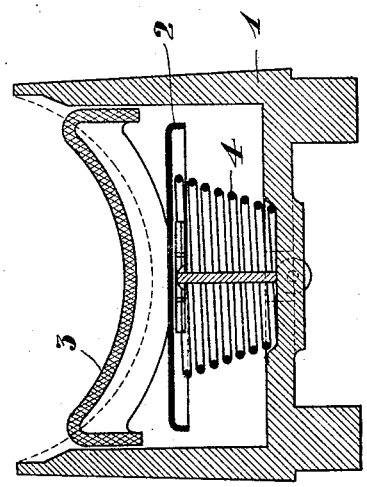
Fig. 2 is a transversal cross section of same.
Figure 1:
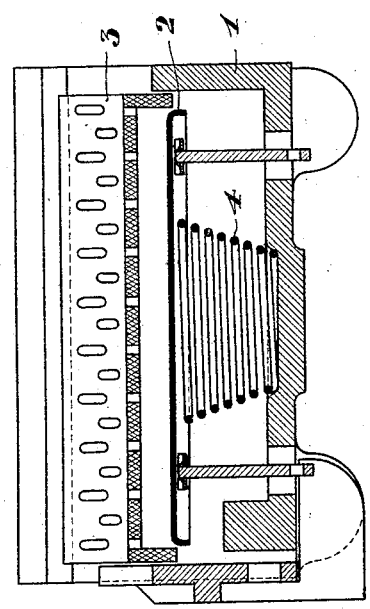
Fig. 1 is a longitudinal cross section of a journal box with my grease strainer.

The journal box (1) is provided with a grease supporting plate (2) normally forced against the strainer (3) by the spiral spring (4) as in the common and known constructions.

The strainer (3) of rather thick plate alloy is curved to adapt itself to the journal, and carries oval conical perforations through which the grease from between the plate (2) and strainer (3) is forced.

Even if small pieces of the strainer should be torn off, the alloy is so soft that any clip could not produce any damage to the journal surface.

Having thus described my invention what I claim is:

A grease strainer for journal boxes of locomotive driving wheels, comprising a curved alloy body composed of 90% lead, 90% antimony and 1% tin, provided with oval conical perforations disposed in staggered position.

In testimony whereof I have affixed my signature.

FRANCISCO FLORES GUERRA.